United States Patent Office 3,239,500
Patented Mar. 8, 1966

3,239,500
PREPARATION OF MODIFIED POLYSACCHARIDES
James L. Keen, New Brighton, William J. Ward and Ronald R. Swanson, Minneapolis, and Herbert N. Dunning, St. Paul, Minn., assignors to General Mills, Inc., a corporation of Delaware
No Drawing. Filed Aug. 16, 1963, Ser. No. 302,715
22 Claims. (Cl. 260—209)

The present invention relates to an improved process for preparing certain modified polysaccharides. More particularly, it relates to a process of preparing periodate oxidized polysaccharides wherein the iodate formed during the oxidizing operation is removed or recovered by the use of a water immiscible organic phase containing an anion exchange material.

It is known that various polysaccharides can be oxidized with periodic acid to provide highly useful dialdehyde polysaccharide materials. These products, and particularly the bisulfite adducts thereof, are excellent additives in the production of paper, being added in the beater, head box, fan pump or regulator.

In preparing the described modified products, the polysaccharide is generally first mixed with aqueous periodate in the desired ratios during which the polysaccharide is oxidized and the periodate is reduced to iodate. There is thus obtained a mixture of the modified polysaccharide and the iodate which is in the form of iodic acid ($H^+IO_3^-$) or the alkali metal salts thereof. This mixture can be used as a beater additive or in other applications without isolating the modified polysaccharide from all or a substantial proportion of the iodate. However, periodates are expensive and thus it is highly desirable to recover the iodate and regenerate the periodate therefrom. Furthermore, in some applications it may be undesirable to utilize a mixture of the modified polysaccharide and the iodate. For example, when the bisulfite aducts of the modified polysaccharides are to be prepared, the presence of the iodate increases the amount of sodium bisulfite needed to prepare the adduct since approximately 3 moles of $NaHSO_3$ are required to react with each mole of iodate present. This further increases the cost of the ultimate additive.

One method of removing the iodate anions from the oxidized polysaccharides is to wash the product with water followed by a filtration step. If several washing and filtering steps are employed, all or a substantial portion of the iodate can be removed from the modified polysaccharide. However, there may be a loss of up to about 20% of the modified polysaccharide as solubles in the wash water. Such loss of soluble product further increases the cost of the additives and, in addition, the solubles interfere with the electrolytic regeneration of periodate from the iodate anions. Thus in order to make the regeneration operation attractive economically, the solubles must be removed from the filtrate or wash waters. Still further, the washing generally requires a fairly large volume of water which produces a dilute solution of the iodate necessitating concentration of the iodate prior to regeneration of the periodate therefrom.

It is, therefore, an object of the present invention to provide an improved process for the preparation of periodate oxidized polysaccharides.

Another object of our invention is to provide such a process wherein iodate anions are easily removed and/or recovered from the periodate oxidized polysaccharides.

A further object of the invention is to provide such a process for the preparation of periodate oxidized polygalactomannan gums.

These and other objects will become apparent from the following detailed description.

We have now discovered that iodate can be removed or recovered from periodate oxidized polysaccharides by the use of a water immiscible organic phase containing an anion exchange material. Thus we have discovered that iodate can be removed by treating the moist, oxidized polysaccharide directly with the organic phase or by first water washing the moist, oxidized polysaccharide and then contacting the filtrate containing the iodate anions with the organic phase. The iodate can then be stripped from the organic phase and periodate can be regenerated therefrom electrolytically.

A simplified flow diagram of the above-described process is as follows:

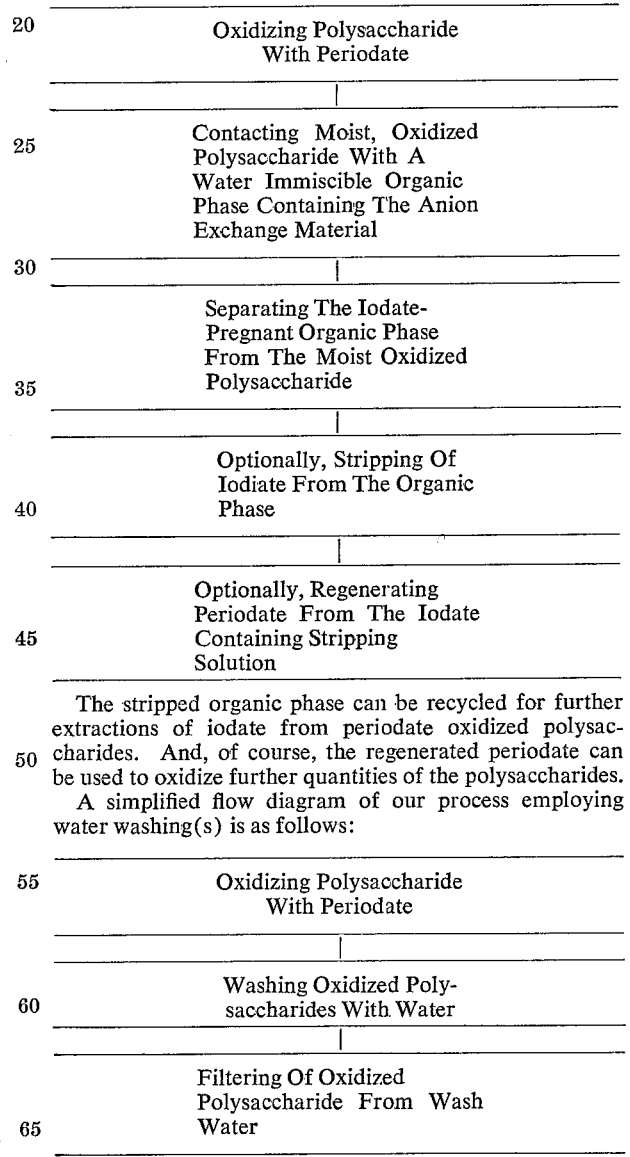

The stripped organic phase can be recycled for further extractions of iodate from periodate oxidized polysaccharides. And, of course, the regenerated periodate can be used to oxidize further quantities of the polysaccharides.

A simplified flow diagram of our process employing water washing(s) is as follows:

| Contacting Filtrate With A Water Immiscible Organic Phase Containing The Anion Exchange Material |
|---|
| Separating The Iodate-Pregnant Organic Phase From The Iodate-Barren Filtrate Phase |
| Optionally, Stripping Of Iodate From The Organic Phase |
| Optionally, Regenerating Periodate From The Iodate Containing Stripping Solution |

Of course, the stripped organic phase can be recycled and the regenerated periodate can be used to oxidize further quantities of polysaccharides. Additionally, the soluble polysaccharide products in the iodate-barren filtrate phase can be recovered such as by evaporation and added to the washed, oxidized polysaccharide product.

A wide variety of polysaccharides can be used in the process of the present invention. Examples of such materials are starches such as corn starch, wheat starch, tapioca starch, and potato starch, celluloses, dextran and polygalactomannans. The process is particularly valuable for the treatment of polygalactomannan gums. Preferred gums are guar gum and locust bean gum. Guar gum is a polygalactomannan in which the structural chain is made up of D-mannose units with 1–4 linkages. A D-galactose unit is linked 1–6 on the average of every second D-mannose unit of the chain. The ratio of galactose of mannose is, therefore, 1 to 2. Locust bean gum is also a polygalactomannan gum of similar molecular structure in which the ratio of galactose to mannose is 1 to 4.

The oxidation of the polysaccharides can be carried out using various oxidizing agents. The agents employed are the periodic acids, the alkali metal salts of periodic acids, such as sodium and potassium periodate, and the like.

The polygalactomannan gums are preferably oxidized according to the procedure disclosed and claimed in the copending application of Joseph W. Opie and James L. Keen entitled, "Modified Polygalactomannan Gum and Method of Preparing Same," Serial No. 47,610, filed August 5, 1960, and now abandoned, which disclosure is incorporated herein by reference. The gums are preferably oxidized with less than stoichiometric amounts of the periodate oxidizing agent. Thus from 0.01 mole to 1.0 mole and preferably 0.05 mole to 0.25 mole of periodate is used with 1.0 mole of anhydrous hexose unit.

The ratio of galactose to mannose in the guar polymer is one of two as indicated above. Thus after oxidation with 0.25 mole periodate per mole hexose unit, the ratio of galactose to mannose is found to be about one to three, indicating that the galactose is preferentially attacked by the periodate. Therefore, oxidation of the guar with the designated amounts of periodic acid will yield a long polymeric chain of mannose units that are partially substituted with aldehydic functions on every other unit of the chain. This aldehydic function is due to the formation of carbonyl groups during the cleavage of galactose units by the periodate. Thus the oxidized gums are sometimes referred to as aldehyde gums.

The polygalactomannan gums are quickly hydrated, becoming sticky or even entering solution. In order to avoid expensive isolation problems which occur when gum is oxidized in dilute solution, the oxidation is preferably carried out under conditions wherein the oxidized gum is maintained in granular form. Thus the oxidation can be completed by carrying out the reaction in certain aqueous solvents or with very limited amounts of water. By carrying out the periodate oxidation in an aqueous system containing sufficient organic liquid to prevent gelation of the gum there is produced a granulated gum which can be isolated by filtration. Preferably, the organic solvent should be one that will not react with the oxidation product or in itself be attacked by the periodate.

Another system for carrying out the oxidation takes advantage of the fact that gums that have been oxidized with periodic acid in limited amounts of water are insoluble in water. In such case, a relatively dry gum, one having a water level less than 20% and generally having a water content of about 10–15%, is mixed as is, or as suspended in a water immiscible solvent, while a periodic acid solution or a solution of a salt of periodic acid is added to the mixer. As the reaction and aging occurs, the gum becomes insoluble.

The oxidation can also be carried out by utilizing a dry blend of the polygalactomannan gum and periodic acid or the alkali metal salts thereof which can serve as a precursor of the oxidized gums, generating such oxidized gums merely by addition of the dry blend to water, generally having a pH of 4 to 7.

After the periodate oxidation of the described polysaccharides, they are contacted with or without filtration or isolation with a water immiscible organic phase containing an anion exchange material. A wide variety of anion exchange materials are useful in the process of the present invention. The term "anion exchange material" as used herein refers to ion exchange materials which are capable of exchanging anionic materials. Ion exchange materials are commonly designated by the type of ion which is absorbed, rather than by the chemical properties of the ion exchange material. Accordingly anion exchange materials could be cationic compounds. The types of materials useful in the present invention are those anion exchange materials commonly referred to as "liquid ion exchange materials." The "liquid" refers to the fact that these ion exchange materials are used in solution rather than in a solid state as is the case with ion exchange resins. Many of the liquid ion exchange materials are liquids at room temperature, while others are normally solid materials. When the solid materials are dissolved in a suitable solvent, there is formed a solution which has ion exchange properties.

The preferred anion exchange materials are the water-immiscible amines. Amines which have a fairly high degree of insolubility in water are generally preferred since this will aid in preventing attrition of large amounts of amine. Consequently, it is preferred to employ materials having more than about 10 carbon atoms. As between primary, secondary and tertiary amines, the secondary amines are preferred. The secondary amines are generally less soluble in water than the primary amines and are usually more effective extractants. The tertiary amines are also good extractants, however they are often more expensive and somewhat more difficut to prepare than the secondary amines. The preferred amines are generally aliphatic in character although they may be partially aromatic. Particularly preferred materials are the secondary and tertiary amines containing at least one aliphatic hydrocarbon group of from approximately 8 to approximately 22 carbon atoms. These aliphatic hydrocarbon groups may be straight chain saturated or unsaturated. In place of these straight chain aliphatic groups, the amines may contain branched chain groups, such as those derived from olefinic sources. In addition, it is possible to use amines containing one or more branched chain groups and/or one or more straight chain groups.

Typical amines which may be used in our process are the following:

(1) 

in which $R_1$ is an aliphatic hydrocarbon group having a tertiary carbon atom at the point at which it is attached to the nitrogen atom. The substituents attached to this tertiary carbon atom are alkyl groups totaling from 11 to 14 carbon atoms in the three alkyl groups. $R_2$ is a $C_{12}H_{25}$ group. A product of this type is available on the market and is sold as Amberlite LA 2.

(2) 

in which $R_1$ is as above-described and $R_3$ is the group

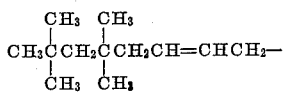

A product of this type is available on the market and is sold as Amberlite LA 1.

(3) The compound bis (1-isobutyl-3,5-dimethyl hexyl amine) having the formula

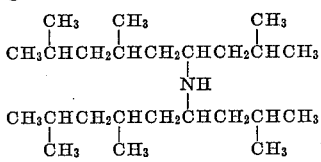

(4) Di(3,5,7-trimethyloctyl) amine having the formula

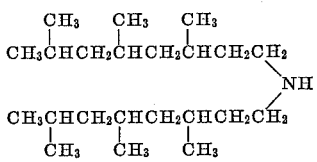

(5) 6-benzylamino-3,9 diethyltridecane having the formula

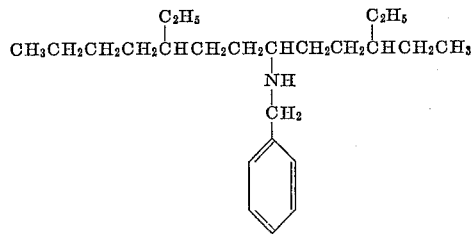

(6) 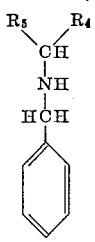

in which $R_4$ and $R_5$ are alkyl groups containing from 7 to 11 carbon atoms.

Specific examples of other amines which are useful in the present invention include lauryl amine, myristyl amine, palmityl amine, stearyl amine, oleyl amine, linoleyl amine, laurylmethyl amine, myristylmethylamine, palmitylmethyl amine, stearylmethyl amine, oleylmethyl amine, linoleylmethyl amine, dilauryl amine, dimyristyl amine, dipalmityl amine, distearyl amine, dioleyl amine, dilinoleyl amine, trilauryl amine, dilaurylmethyl amine, distearylmethyl amine, dioctyl amine, dibenzyl amine, diisooctyl amine, benzyllauryl amine, 3 - phenylpropyltetradecyl amine, trioctyl amine, triisooctyl amine, benzyldilauryl amine, dibenzylmethyl amine, β-hydroxyethyl dilauryl amine, β-hydroxydodecyldinonyl amine, tridecyl amine, decylpiperidine, lauryl morpholine, octadecyl morpholine.

Another group of materials which is useful in the process of the present invention are the hydroxy fatty nitrogen compounds which have two nitrogen containing groups, one of which is situated on a carbon atom adjacent to a hydroxyl group, the other situated in a group occupying a terminal position. Commercially, these materials are prepared from oleic acid and accordingly have 18 carbon atoms in the main carbon chain. However, they may also be derived from other lower or higher molecular weight unsaturated acids. Because of the method of preparation, these materials are usually mixtures of isomers. Generally, the isomers are not separated for most commercial uses. Specific examples of such materials include 9-amino-10-hydroxystearonitrile,
9-dimethylamino-10-hydroxystearonitrile,
9-anilino-10-hydroxystearonitrile,
9-morpholino-10-hydroxystearonitrile,
10-dodecylamino-9-hydroxystearonitrile,
10-meta-aminophenylamino-9-hydroxystearonitrile,
9-diethanolamino-10-hydroxystearyl amine,
10-β-aminoethylamino-9-hydroxystearyl amine,
9-dodecylamino-10-hydroxystearyl amine,
9-(β-cyanoethyl)-amino-10-hydroxystearonitrile,
10-N-(β-cyanoethyl)-dodecylamino-9-hydroxystearonitrile,
9-(gamma-aminopropyl)-methylamino-10-hydroxystearyl amine,
9-(gamma-aminopropyl)-anilino-10-hydroxystearyl amine,
9-morpholino-10-hydroxystearyl morpholine,
9-dimethylamino-10-hydroxystearyldimethyl amine, and the like. These materials can be represented by the formula:

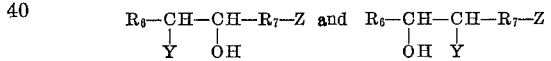

where $R_6$ and $R_7$ are aliphatic hydrocarbon radicals of 1 to 22 carbon atoms and the total number of carbon atoms in $R_6$ and $R_7$ is 6–22, Y is an amino radical and Z is an amino radical or nitrile.

As indicated above, the anionic exchangers are preferably amines. They can be readily stripped and reused and are excellent extractants. However, other anion exchange materials such as the quaternary ammonium compounds can also be used. These materials are difficult to strip and thus are less preferred than the amines. Specific examples of such quaternary compounds are lauryltrimethyl ammonium chloride, myristyltrimethyl ammonium chloride, palmityltrimethyl ammonium chloride, stearyltrimethyl ammonium chloride, oleyltrimethyl ammonium chloride, linoleyltrimethyl ammonium chloride, dilauryldimethyl ammonium chloride, dimyristyldimethyl ammonium chloride, dipalmityldimethyl ammonium chloride, distearyldimethlyl ammonium chloride, dioleyldimethyl ammonium chloride, dilinoleyldimethyl ammonium chloride, trilaurylmethyl ammonium chloride, trioctylmethyl ammonium chloride, tridecylmethyl ammonium chloride, stearylbenzyldimethyl ammonium chloride, N-trimethyl-N'-dimethyllauryl propylene diammonium dichloride, N - trimethyl - N' - dimethyltallow propylene diammonium dichloride, and the like. Most of these materials are represented by the formula:

where $R_8$ is an aliphatic or aromatic radical of 6 to 24 carbon atoms and $R_9$, $R_{10}$ and $R_{11}$ are hydrocarbon radicals of 1 to 24 carbon atoms and X is an inorganic anion.

The following quaternary compounds are also useful: 1,9-di(trimethyl ammonium)-10-hydroxyoctadecane dichloride, 1,9-di-(dimethylbenzyl ammonium)-10-hydroxyoctadecane dichloride, 1,9-di-(benzylmorpholinium)-1,10-hydroxyoctadecane dichloride, 1,9-di-(trimethyl ammonium)-9-hydroxyoctadecane dimethyl sulfate, 1,9-di-(trimethyl ammonium)-10-hydroxyoctadecane dibromide, 1-cyano-9-(trimethyl ammonium)-10-hydroxyheptadecane chloride, 1-cyano-10-(N-methylmorpholinium)-9-hydroxyheptadecane chloride, and 1-cyano-9-(trimethyl ammonium-10-hydroxyheptadecane methyl sulfate. Such compounds can be represented by the formulas:

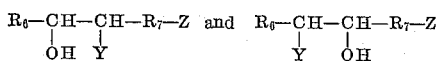

where $R_6$ and $R_7$ are aliphatic hydrocarbon radicals of 1 to 22 carbon atoms and the total number of carbon atoms in $R_6$ and $R_7$ is 6–22, Y is an amino radical or quaternary ammonium radical and Z is an amino radical, quaternary ammonium radical or nitrile, at least one of Y or X being a quaternary ammonium radical.

In addition to the anion exchange material, the organic phase generally also includes a solvent or diluent. The diluent may be selected from a wide variety of liquid organic materials. Preferred organic solvents are halogenated hydrocarbons and hydrocarbons such as chloroform, ethylene dichloride, isooctane, kerosene, "Soltrol 170" (a commercially available naphthenic hydrocarbon solvent), benzene, toluene, xylene, isodecane, fuel oils, mineral oils, hexane, heptane and octane. Among halogenated solvents, the most preferred are chlorinated hydrocarbons containing at least one group having the structure

Other solvents such as as benzyl acetate, decyl alcohol and the like may also be used and combinations of diluents can be employed. The concentration of the anion exchange material in the organic phase can vary widely but will generally be in the range of about 2 to 50% by weight and preferably in the range of about 2 to 15% by weight. A particularly preferred concentration is about 5% to 10% by weight. The organic phase may also contain other materials such as conditioners in the amount of 1 to 15% by weight, for example. Illustrative conditioners are capryl alcohol, isodecanol, tridecyl alcohol, 2-ethyl hexanol, tributyl phosphate and the like.

The oxidized polysaccharide and the organic phase are preferably agitated during the extraction step. The organic phase extracts a substantial proportion or all of the iodate into the organic phase which is then separated from the moist, oxidized polysaccharide by filtration. The separated polysaccharide can be contacted one or more times with recycled or fresh amine extractant to remove any remaining iodate. Of course, for many applications it is not essential to remove the iodate completely from the oxidized polysaccharide.

As indicated above, the oxidized polysaccharide can also be washed with water followed by filtration. Several washing and filtration steps can be employed and then the various wash solution or filtrates (including the original filtrate) can be combined. The filtrate(s) are then contacted according to our invention with the water immiscible organic phase containing the anion exchange material, preferably with agitation. The iodate anions are thus extracted into the organic phase which is separated from the iodate-barren aqueous phase by virtue of their immiscibility. The solubles in the aqueous phase can be recovered such as by evaporation and added, if desired, to the water washed oxidized polysaccharide.

Before contacting the filtrate(s) with the organic phase, they may optionally be treated with a cation exchange resin to remove or exchange at least a portion of cations (i.e., $Na^+$) therefrom. Such treatment improves the iodate anion extractions. A representative cation exchange resin is Dowex 50W–X8 (sulfonated polystyrene).

The relative amounts of the moist, oxidized polysaccharide or the filtrates and the organic phase can be varied widely, such as from about 1000:1 to 1:1000. Preferably, however, the volume ratio of the particulate polysaccharide or filtrate to the organic phase containing the amine extractant will be in the range of about 4:1 to 1:4.

Where the starting polysaccharide, such as a polygalactomannan gum, contains a substantial amount of alkali metal (i.e., sodium) cations or the periodate used is either an alkali metal periodate or a mixture thereof with a periodic acid, the moist oxidized polysaccharide or water washing solutions are preferably acidified with a mineral acid such as phosphoric acid prior to or at the same time as the contacting thereof with the water immiscible organic phase. This procedure greatly improves the extraction of the iodate anion ($IO_3^-$) but has the disadvantage of introducing phosphate anions into the oxidized products. For many applications, however, the phosphate ions do not detract from the utility of the oxidized polysaccharides. It is preferred to use starting polysaccharides which the substantially free from alkali metal or other cations and/or periodic acids which are relatively pure, containing at most small amounts of the alkali metal periodates.

The iodate values can be recovered from the iodate-pregnant organic phase by treating the same with an aqueous stripping solution. Preferably, the stripping solution is a solution of an alkali metal hydroxide, such as sodium hydroxide, in water. However, other basic materials can be employed including basic salts, ammonia and the like. The aqueous stripping solution is separated from the now iodate-barren organic phase by virtue of their immiscibility. The organic phase can then be recycled for further extractions of the moist, oxidized polysaccharides of wash solutions derived therefrom.

The aqueous stripping medium which contains the iodate anions can be cycled to an electrolytic cell for the regeneration of periodate. The stripping solution may be quite dilute but is more preferably fairly concentrated. The concentration of iodate anions can be controlled rather easily by selecting the proper phase ratios of the iodate-pregnant organic phase and the stripping solution. Where aqueous NaOH is used, the stripping solution entering the electrolytic cell will contain sodium iodate ($Na^+IO_3^-$) which can be adjusted to produce a mixture of mostly periodic acid with some sodium periodate (i.e., 75% $HIO_4$ and 25% $NaIO_3$) after regeneration. This mixture could be used to oxidize further amounts of polysaccharide but is preferably passed through an ion exchanger to produce a substantially pure periodic acid solution. As indicated above, the use of such pure solution lessens the need for phosphoric acid acidification of the oxidized polysaccharide or filtrate solutions.

The purified, oxidized polysaccharides produced by our process can be used as additives for paper directly. However, such products are not easily water soluble and thus are preferably first treated with a slight excess of 2 moles of $NaHSO_3$ per mole of periodate used in the production of the said dialdehyde polysaccharide. This is readily done by intimately mixing the correct amount of bisulfite with the moist aldehyde product and drying the resulting mixture with heating. This procedure gives the bisulfite reaction compound of the oxidized polysaccharide which is readily water soluble and highly useful for improving the wet strength of paper.

The invention is further described by the following examples. The examples are illustrative only and do not constitute limitations on the invention.

Example I

To two liters $CHCl_3$ was added 183 g. finely ground guar gum with stirring. Three hundred milliliters of an aqueous solution containing 23 g. $H_5IO_6$ (100 meq. paraperiodic acid) were added slowly to the gum suspended in the chloroform. After ½ hour, the chloroform was filtered away from the moist, particulate, oxidized gum-iodate mixture. The mixture was then suspended in 1.5 liters of chloroform to which 150 ml. fatty tertiary amine extractant was added. The whole was mixed about 20 minutes and then the oxidized gum was filtered away from the organic phase. The chloroform-amine organic phase was mixed with a solution of about 20 g. NaOH in 380 ml. water which stripped the iodate ($IO_3^-$) from the organic phase. The iodate concentration in the stripping solution was determined by analysis. The extraction of iodate from the oxidized gum was repeated a number of times, followed by stripping and analysis and the results are set forth in the following Table I. The amine extractment employed was a tertiary amine in which the alkyl groups were straight chain hydrocarbon groups containing principally 8 and 10 carbon atoms with a minimum amount of 12 carbon atom alkyl groups. These alkyl groups were derived from the mixed $C_8$, $C_{10}$ and $C_{12}$ acids of coconut oil.

TABLE I

| Extraction No. | Extraction time, minutes (approx.) | Meq. $IO_3^-$ extracted |
|---|---|---|
| 1 | 15 | 60.0 |
| 2 | 15 | 8.4 |
| 3 | 20 | 3.3 |
| 4 | 45 | 1.1 |
|   |    | [1] 72.8 |

[1] Total.

The above example shows that a total of 72.8 meq. $IO_3^-$ was extracted from the oxidized gum-iodate mixture using an organic phase comprising chloroform and a fatty tertiary amine. The moist, particulate dialdehyde gum after the extractions contained only 18.6 meq. $IO_3^-$.

Example II

Example I was repeated except that the 300 ml. aqueous solution used to oxidize the gum also contained 2 ml. 85% $H_3PO_4$ in water. The phosphoric acid was added to aid in the extraction of $IO_3^-$ by the organic phase containing the fatty tertiary amine. Results are set forth in the following Table II:

TABLE II

| Extraction No. | Extraction time, minutes (approx.) | Meq. $IO_3^-$ extracted |
|---|---|---|
| 1 | 10 | 70 |
| 2 | 10 | 9.8 |
| 3 | 50 | 2.5 |
|   |    | [1] 82.3 |

[1] Total.

This example shows that the addition of small amounts of phosphoric acid aids the extraction of the iodate from the oxidized gum. The extracted gum contained only 8.5 meq. $IO_3^-$.

Equally good results are obtained using diluents other than chloroform such as ethylene dichloride and the like. Where a guar gum is used containing substantial amounts of sodium ($Na^+$) or where the oxidizing agent consists of or contains an alkali metal periodate, additional amounts of phosphoric acid are added to aid in the extraction of iodate. Very good results are also obtained when other polysaccharides, such as locust bean gum, are treated in accordance with our process. The stripping solutions containing the $IO_3^-$ can be added to electrolytic cells and periodate regenerated therefrom. Also, as indicated above, the oxidized polysaccharide can be water washed and the filtrate contacted with the organic phase containing the amine extractant. This is shown by the following examples.

Examples III–XXIV

Guar gum was oxidized in the same manner as set forth in Example I and then water washed. The resulting filtrates were treated with mineral acid or were treated with an ion exchange resin (Dowex 50W-X8) to remove cations prior to the contacting thereof with various solvent-anion exchange material systems. The aqueous and organic phases were mixed, allowed to separate and then analyzed to determine the amount of $IO_3^-$ transferred from the aqueous to the organic phase. The results are set forth in the following Table III with the organic phase being defined for each of the examples in Table IV.

TABLE III

| Exp. | Filtrate | | | | Organic: Aqueous, vol. phase ratio | $IO_3^-$ extraction from filtrate (percent) |
|---|---|---|---|---|---|---|
|  | Normality $IO_3^-$ | $Na^+$ (p.p.m.) | Acid treatment | | | |
|  |  |  | Acid | pH | | |
| III | .06 | 4,200 | $H_3PO_4$ | 1.9 | 50:50 | 85.0 |
| IV | .195 | 4,200 | $H_3PO_4$ | 2.6 | 50:50 | 32.0 |
| V | .195 | 4,200 | $H_3PO_4$ | 2.2 | 100:50 | 50.8 |
| VI | .195 | 4,000 | $H_3PO_4$ | 3.7 | 100:50 | 56.4 |
| VII | .195 | 4,200 | $H_3PO_4$ | 2.2 | 100:50 | 60.0 |
| VIII | .195 | 4,200 | $H_3PO_4$ | 2.2 | 100:50 | 67.0 |
| IX | .195 | 4,200 | $H_3PO_4$ | 2.0 | 100:50 | 79.0 |
| X | .195 | 4,200 | $H_3PO_4$ | 2.2 | 50:50 | 58.0 |
| XI | .195 | 4,200 | $H_3PO_4$ | 2.2 | 50:50 | 69.2 |
| XII | .162 | [1] 21 | None [2] |  | 50:50 | 94.4 |
| XIII | .162 | 21 | do |  | 100:25 | 95.0 |
| XIV | .162 | 21 | do |  | 50:25 | 93.0 |
| XV | .162 | 21 | do |  | 50:50 | 58.0 |
| XVI | .162 | 21 | do |  | 50:50 | 96.3 |
| XVII | .162 | 21 | do |  | 50:50 | 95.0 |
| XVIII | .193 | 21 | do |  | 70:50 | 95.3 |
| XIX | .193 | 21 | do |  | 50:50 | 96.9 |
| XX | .135 | 13 | do |  | 80:90 | 95.5 |
| XXI | .144 | 560 | do |  | 50:50 | 61.1 |
| XXII | .129 | 10 | do |  | 50:50 | 96.0 |
| XXIII | .100 | 10 | do |  | 50:50 | 95.0 |
| XXIV | .050 | 10 | do |  | 50:50 | 92.0 |

[1] Filtrate treated with ion exchange resin to reduce cation ($Na^+$) content in Example XII–XXIV.
[2] No acid treatment in Examples XII–XXIV.

TABLE IV.—ORGANIC PHASE

| Exp. | Solvent | Anion exchange material | Wt. percent anion ex. changer |
|---|---|---|---|
| III | Chloroform | Mixture of trioctyl and tridecyl amines. | 10 |
| IV | Decyl alcohol | 9(10-dodecylamino-10(9)-hydroxystearonitrile. | 10 |
| V | do | do | 10 |
| VI | do | 9(10-dodecylamino-10(9)-hydroxystearyl amine. | 10 |
| VII | do | do | 10 |
| VIII | Kerosene | do | 10 |
| IX | do | 9(10)-dodecylamino-10(9)-hydroxystearonitrile. | 10 |
| X | do | do | 20 |
| XI [1] | do | do | 30 |
| XII | do | do | 30 |
| XIII | Soltrol 170 | Dioleyl amine | 6 |
| XIV | do | do | 6 |
| XV | do | do | 6 |
| XVI | Kerosene | Didodecyl amine | 10 |
| XVII | do | Dicoco amine [2] | 10 |
| XVIII | Soltrol 170 | do | 10 |
| XIX–XXIV | do | Didodceyl amine | 10 |

[1] 10 wt. percent isodecanol added as a conditioner in Examples IX–XXIV.
[2] Prepared from the total fraction of fatty acids derived from coconut oil.

The above examples show that a variety of anion exchange materials can be employed in our process to remove or recover $IO_3^-$ anions from the filtrates obtained in the water washing of periodate oxidized polysaccharides. Treatment of the filtrates with either $H_3PO_4$ or an ion exchange resin improves the extraction. The substantially iodate barren aqueous phase can be concentrated and the gum material contained therein added to the water washed oxidized gum to further improve the yield. The iodate-pregnant aqueous phase can be stripped and the resulting aqueous solution added to electrolytic cells to regenerate periodate therefrom.

It is to be understood that the invention is not to be limited to the exact details of operation or the exact processes shown and described as obvious modifications and equivalents will be apparent to those skilled in the art and the invention is to be limited only by the scope of the appended claims.

The embodiments of the invention in which an exclusive property or privilege is claimed are defined as follows:

1. In the process of preparing a modified polysaccharide wherein the polysaccharide is reacted with an oxidizing agent selected from the group consisting of periodic acids and the alkali metal salts thereof, the improvement comprising removing iodate anions from the modified polysaccharide with a water immiscible liquid organic phase containing an anion exchange material.

2. In the process of preparing a modified polysaccharide wherein the polysaccharide is reacted with an oxidizing agent selected from the group consisting of periodic acids and the alkali metal salts thereof, the improvement comprising: contacting the resulting moist, oxidized polysaccharide with a water immiscible organic phase containing an anion exchange material; and separating the iodate-pregnant organic phase from the moist, oxidized polysaccharide.

3. The process of claim 2 wherein the polysaccharide is a polygalactomannan gum.

4. The process of claim 3 wherein the oxidizing agent is employed in an amount of from 0.01 mole to 1.0 mole per mole of anhydrohexose unit.

5. The process of claim 2 wherein the water immiscible liquid organic phase comprises an anion exchange material and a diluent.

6. The process of claim 2 wherein the anion exchange material is an amine.

7. The process of claim 6 wherein the amine is selected from the group consisting of secondary and tertiary amines having at least one aliphatic hydrocarbon group of from about 8 to 22 carbon atoms.

8. The process of claim 2 wherein the water immiscible liquid organic phase contains about 2 to 50% by weight of the anion exchange material.

9. The process of claim 2 wherein the moist, oxidized polysaccharide is acidified with phosphoric acid prior to the contacting thereof with the organic phase.

10. The process of claim 2 wherein the iodate-pregnant organic phase is contacted with an aqueous phase containing a basic material selected from the group consisting of alkali metal hydroxides and ammonia; and the resulting iodate-pregnant aqueous phase is then separated from the iodate-barren organic phase.

11. The process of claim 10 wherein the basic material is sodium hydroxide.

12. The process of claim 10 wherein the iodate-pregnant aqueous phase is added to an electrolytic cell and periodate is generated therefrom.

13. In the process of preparing a modified polysaccharide wherein the polysaccharide is reacted with an oxidizing agent selected from the group consisting of periodic acids and the alkali metal salts thereof, the resulting moist, oxidized polysaccharide is washed with water and the oxidized polysaccharide is filtered from the wash water, the improvement comprising: contacting the wash water with a water immiscible liquid organic phase containing an anion exchange material; separating the iodate-pregnant organic phase from the iodate-barren aqueous wash water; contacting the iodate-pregnant organic phase with an aqueous phase containing a basic material selected from the group consisting of alkali metal hydroxides and ammonia; separating the resultant iodate-pregnant aqueous phase from the iodate-barren organic phase; and recycling the organic phase for contacting additional quantities of wash water obtained by washing the moist, oxidized polysaccharide.

14. The process of claim 13 wherein the polysaccharide is a polygalactomannan gum.

15. The process of claim 14 wherein the oxidizing agent is employed in an amount of from 0.01 mole to 1.0 mole per mole of anhydrohexose unit.

16. The process of claim 13 wherein the water immiscible liquid organic phase comprises an anion exchange material and a diluent.

17. The process of claim 13 wherein the anion exchange material is an amine.

18. The process of claim 17 wherein the amine is selected from the group consisting of secondary and tertiary amines having at least one aliphatic hydrocarbon group of from about 8 to 22 carbon atoms.

19. The process of claim 13 wherein the organic phase contains about 2 to 50% by weight of the anion exchange material.

20. The process of claim 13 wherein the wash water is acidified with phosphoric acid prior to the contacting thereof with the organic phase.

21. The process of claim 13 wherein the basic material is sodium hydroxide.

22. The process of claim 13 wherein the iodate-pregnant aqueous phase is added to an electrolytic cell and periodate is generated therefrom.

(References on following page)

References Cited by the Examiner

UNITED STATES PATENTS

| | | | |
|---|---|---|---|
| 2,635,061 | 4/1953 | McBurney | 260—209 |
| 2,880,236 | 3/1959 | Mehltretter | 260—233.3 |
| 2,988,455 | 6/1961 | Rosenberg | 260—233.3 |
| 3,074,820 | 1/1963 | Kunin | 210—21 XR |
| 3,086,969 | 4/1963 | Slager | 260—209 |

FOREIGN PATENTS 361,129  3/1961  Japan.

OTHER REFERENCES

Okuno Hisateru et al., Bunseki Kagaku, vol. 9 (1960), pages 963–4 CA citation: vol. 57, p. 132 (July 1962).

Uchida, Hishashi, Chemical Abstracts, vol. 56 (1962), p. 5428.

LEWIS GOTTS, *Primary Examiner.*

IRVING MARCUS, *Examiner.*